United States Patent [19]

Kaukeinen

[11] Patent Number: 5,006,201
[45] Date of Patent: Apr. 9, 1991

[54] METHOD OF MAKING A FIBER OPTIC ARRAY

[75] Inventor: Joseph Y. Kaukeinen, Rochester, N.Y.

[73] Assignee: Eastman Kodak Company, Rochester, N.Y.

[21] Appl. No.: 440,159

[22] Filed: Nov. 22, 1989

[51] Int. Cl.⁵ .............. H01L 21/306; B44C 1/22; C03C 15/00; C03C 25/06
[52] U.S. Cl. ............................ 156/633; 156/654; 156/659.1; 156/662
[58] Field of Search .............. 156/629, 630, 633, 647, 156/654, 655, 657, 659.1, 662, 663; 350/96.25, 96.3; 65/4.3

[56] References Cited

U.S. PATENT DOCUMENTS

| | | | |
|---|---|---|---|
| 4,264,130 | 4/1981 | Ogura | 350/96.25 |
| 4,376,282 | 3/1983 | Kotani et al. | 346/107 R |
| 4,389,655 | 6/1983 | Baues | 346/107 R |
| 4,740,803 | 4/1988 | Hardy | 354/80 |
| 4,875,969 | 10/1989 | Hsu et al. | 156/633 |
| 4,880,494 | 11/1989 | Kaukeinen et al. | 156/633 |

*Primary Examiner*—William A. Powell
*Attorney, Agent, or Firm*—Donald D. Schaper

[57] ABSTRACT

A method is disclosed for making a fiber optic array for use in an optical scanning device. The array includes a substrate and rows of optical fibers stacked on the substrate. The optical fibers are all of a predetermined diameter. In order to precisely space the fibers relative to each other, the fibers in the first row are arranged in grooves in the substrate, and each succeeding row of fibers is disposed on the fibers of the preceding row.

12 Claims, 3 Drawing Sheets

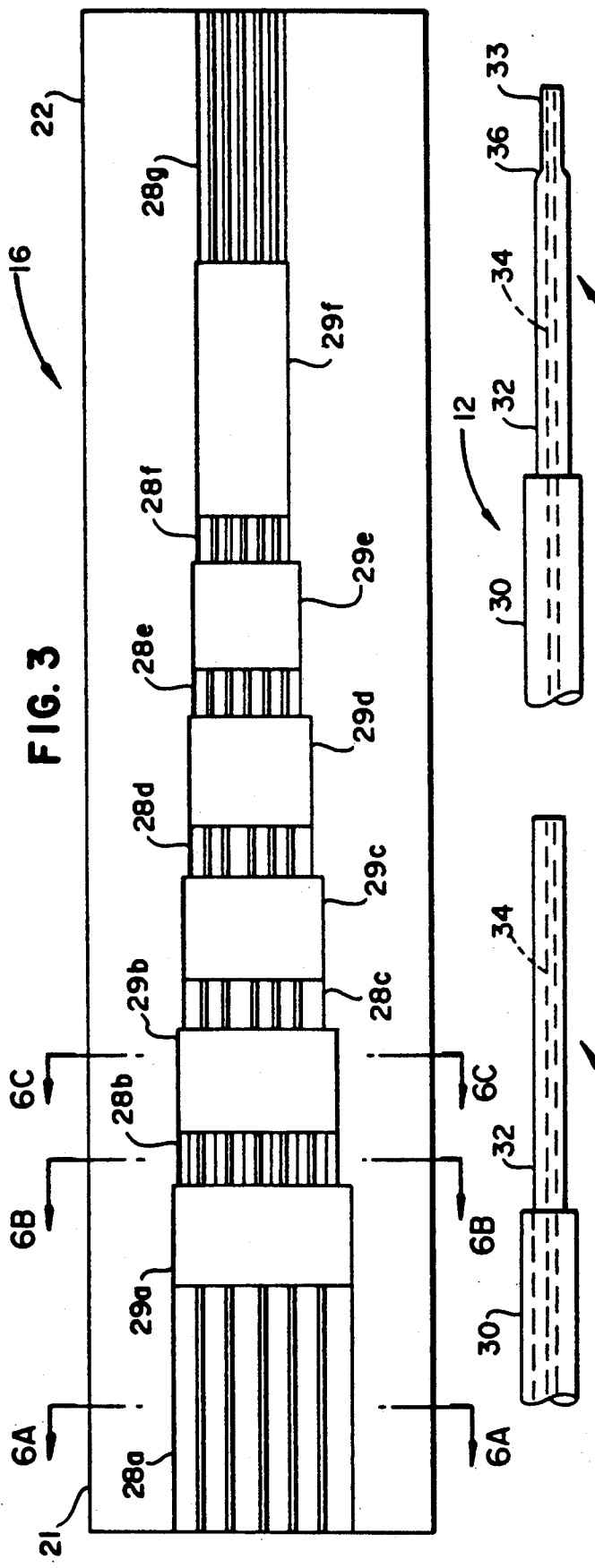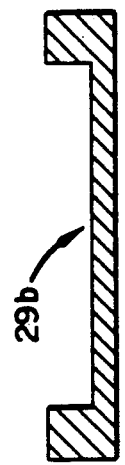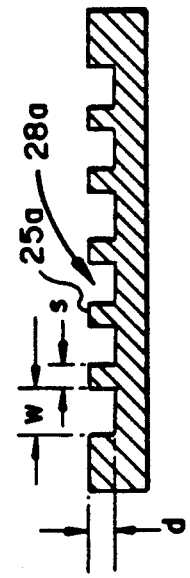

METHOD OF MAKING A FIBER OPTIC ARRAY

CROSS REFERENCE TO RELATED APPLICATIONS

Reference is made to U.S. Pat. application, Ser. No. 254,757, entitled "Fiber Optic Array," filed on Oct. 7, 1988, in the name of Kaukeinen, and now U.S. Pat. No. 4,923,275, issued May 8, 1990and to U.S. Pat. application, Ser. No. 440,153, entitled "Fiber Optic Array," filed on even date herewith, in the name of Baek et al. These applications are assigned to the assignee of the present invention.

BACKGROUND OF THE INVENTION

1. Field of the Invention

The present invention relates to a method of making a fiber optic array, and more particularly, to a method of making such an array for use in an optical scanning device.

2. State of the Prior Art

It is known in the prior art to use an array of optical fibers in a print head which is used to record information on a light-sensitive recording medium. The fibers can be arranged with their output ends in a linear array extending in a direction transverse to the direction of movement of the recording medium, and a light source, such as a light-emitting diode or a diode laser, can be connected to each of the fibers at an input end. The light in each of the fibers is modulated in accordance with an information signal to produce a desired image. Focusing means can be used in front of each fiber to cause the light to be focused to a point on the recording medium. It is desirable for the arrays of optical fibers to have a high packing density, i.e., a high number of fibers per unit width of the array, in order to limit the amount of data buffering needed to produce the output image. There is a problem, however, in using increasingly thinner fibers to increase the packing density. As the fibers are made thinner, handling and alignment of the fibers becomes more difficult, and the thinner fibers are more likely to break in the assembly process.

Another method of increasing the packing density of optical fiber arrays is to use multiple layers, or rows, of fibers, as shown, for example, in U.S. Pat. No. 4,389,655, to Baues. In the Baues patent, there is shown an optical device for non-impact recording in which the recording head includes a linear array of optical fibers. The recording head comprises an adjustment plate having a plurality of grooves therein, and an optical fiber is secured in each of the grooves to form a first row of fibers. A second row of fibers is arranged above the first row, and the fibers in the top row are offset relative to the fibers in the bottom row. The second row of fibers is also supported in grooves in a second adjustment plate, with the grooves of the second adjustment plate facing the grooves of the first adjustment plate. A problem with this arrangement is that it is very difficult to get the proper spacing between the rows of optical fibers. A further problem is that the array is limited to only two layers, and it is advantageous to have more than two layers in certain applications.

SUMMARY OF THE INVENTION

It is an object of the present invention to overcome the problems in the prior art noted above and to provide an improved method of making a fiber optic array for use in scanning devices.

In accordance with one aspect of the invention, there is provided a method of making a fiber optic array, the array having stacked rows of optical fibers, the method comprising the steps of: forming a plurality of grooves in a first substrate, the grooves extending to a first end of the substrate; placing an optical fiber of a predetermined diameter in each of the grooves to form a first row of fibers in which the spacing of the fibers is determined by the pitch of the grooves; cementing the fibers in the grooves; forming a plurality of grooves in a second substrate; cementing an optical fiber of a predetermined diameter in each of the grooves in the second substrate to form a second row of fibers in which a portion of each of the fibers extends beyond one end of the second substrate; placing the second substrate and the fibers therein over the first substrate such that the fibers in the two substrates are in contact with each other and the spacing of the portions of the fibers in the second row is determined by the spacing of the fibers in the first substrate and the diameters of the fibers; and cementing the fibers in the second substrate to the fibers in the first substrate.

The fiber optic array formed by the method of the present invention includes an array of optical fibers having a plurality of rows of fibers. A first row of the fibers are supported in grooves formed in a substrate. The grooves are arranged in aligned sets, and each set of grooves is separated by planar areas on the substrate which are coplanar with the bottoms of the grooves. At an input end of the substrate is a set of grooves which are sized to receive the jackets of the optical fibers; and sets of grooves, which are sized to receive the cladding of the fibers, are spaced along the substrate and extend to an output end of the substrate. The pitch of the grooves in successive sets decreases as the fibers approach the output end of the substrate in order to draw the fibers closer together at the output end.

In one embodiment of the present invention, closely spaced V-shaped grooves are etched in a silicon substrate. An optical fiber is inserted in each of the grooves to form the first row in a linear array of fibers. An adhesive is used to secure the fibers in the grooves in selected areas of the substrate. A second row of optical fibers is placed in a substrate of a reduced length so that the fibers extend from one end thereof. The substrate containing the second row is placed over the substrate containing the first row such that the fibers extending from the one end are placed over the fibers in the first row located at the output end of the array. At the output end of the array, each fiber in the second row is disposed between two adjacent fibers in the first row. Additional rows of fibers can be added if they are needed for a particular application, and after the desired number of rows have been stacked, an adhesive is introduced into the interstices of the ordered rows of fibers. In one embodiment of the present invention, optical fibers having a cladding end portion of reduced diameter are used in order to increase the packing density.

A principal advantage of the method of the present invention is that a very high packing density is obtained as a result of stacking the fibers in multiple rows. Each row of optical fibers, after the first row, is aligned by the fibers in the preceding row. It is possible to control the amount of overlap of spots produced on a recording medium by selecting the spacing of the grooves in the substrate. Another advantage of the method of the present invention is that the optical fibers can be supported on the substrate in close proximity to each other in a manner which does not damage the fibers nor affect the performance of the fibers. A further advantage of one embodiment of the present invention is that increased packing density can be obtained as a result of using fibers in which the cladding diameter at one end is relatively small. Outputs from the closely-spaced and independently-addressable fibers can be imaged onto a receiving medium through a single train of optics with diffraction-limited performance.

Other features and advantages will become apparent with reference to the following Description of the Preferred Embodiments when read in light of the attached drawings.

BRIEF DESCRIPTION OF THE DRAWINGS

FIG. 3 is a plan view of a substrate for the array shown in FIG. 1;

FIG. 4 is a view of an optical fiber in which the jacket has been removed from a portion thereof;

FIG. 5 is a view of an optical fiber which can be used in a second embodiment of the present invention;

FIGS. 6A-6C are sectional views taken along the lines 6A—6A, 6B—6B, and 6C—6C, respectively, in FIG. 3;

DESCRIPTION OF THE PREFERRED EMBODIMENT

Figure 1:
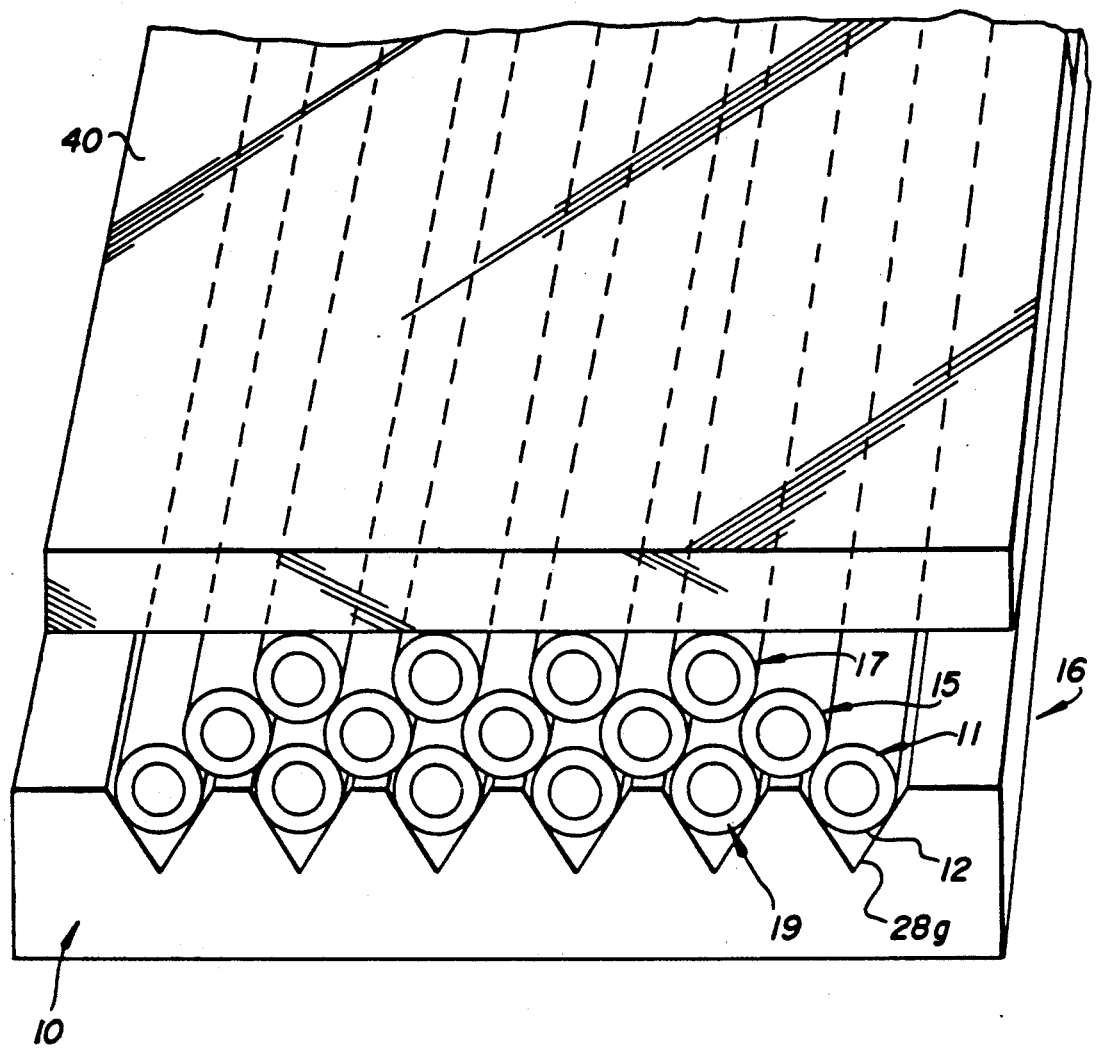
FIG. 1 is a perspective view of an end portion of a fiber optic array which has been made in accordance with the present invention.

With reference to FIG. 1, there is shown an end portion of a fiber optic array 10 which comprises a first row 11 of optical fibers 12 which are supported on a substrate 16. A second row 15 of optical fibers 12 are supported on the fibers 12 in row 11, and a third row 17 of fibers 12 are supported on the fibers 12 in row 15. A glass plate 40 extends over the fibers 12 in row 17, and an epoxy (not shown) fills the void areas between plate 40 and substrate 16.

As discussed hereinafter, fibers 12 in rows 15 and 17 can also be supported on substrates which facilitate the assembly of the array. Each of the fibers 12 can be connected to a light source (not shown) such as a diode laser or a light-emitting diode, and the light source can be modulated according to an information signal in a well-known manner. Array 10 can be used to record information on a light-sensitive medium (not shown) such as a photoconductor or photographic film. Array 10 can also be used as an optical scanner (not shown) in which light reflected from an object is transmitted through the optical fibers to photosensitive elements.

As shown in FIG. 4, each of the optical fibers 12 includes a jacket 30, a cladding 32, and a core 34. In a preferred form of the present invention, the jacket 30 is removed from a portion of the fiber to expose the cladding 32, as shown in FIG. 4; however, the array of the present invention could be formed with optical fibers in which the jackets extend through the entire length of the fiber. The array 12 could also be formed with optical fibers, as shown in FIG. 5, in which the diameter of the cladding in a portion 33 is substantially reduced so that the fibers can be more closely spaced relative to each other. A tapered portion 36 is formed between the portion 33 and the cladding 32. A more complete description of a fiber having an end portion of a reduced diameter and of the method of making such a fiber can be found in the aforementioned U.S. application, Ser. No. 254,757, U.S. Pat. No. 4,923,275 and the disclosure of this application is expressly incorporated herein by reference. A fiber suitable for use in the present invention is a special single-mode fiber made by Corning Glass Works, Fiber No. 56704121, KH1. This fiber is made of silica with germanium doping in the core 34. The jacket 30 has a diameter of 250 $\mu$m, the cladding 32 has a diameter of 125 $\mu$m, and the core 34 has a diameter of 4 $\mu$m. Other optical fibers can be used with the present invention, including multi-mode fibers.

Fibers 12 extend in array 10 from an input end 21 of substrate 16 (FIG. 3) which supports jackets 30 of the fibers to an output end 22 of the substrate 16, and the fibers 12 are closest together at end 22. In order to form the array 10 with the fibers 12 precisely spaced relative to each other at output end 22, all of the fibers 12 must be of the same diameter within a very small tolerance, for example, within ±1 $\mu$m. Fibers 12 are mounted in sets of grooves 28a-28g which are formed in substrate 16 and are separated by planar areas 29a-29f in the substrate 16. Grooves 28a-28g in each set are separated by lands 25a-25g, respectively. Grooves 28a are generally rectangular in cross section, as shown in FIG. 6A, and grooves 28b-28g are generally V-shaped in cross section as shown in FIG. 6B. In a preferred embodiment, the areas 29a-29f (FIGS. 3 and 6C) are coplanar with the bottoms of adjacent grooves; one of the groove bottoms is shown at 27b in FIG. 6B.

Grooves 28a-28g are arranged to space fibers 12 progressively closer together in the direction of output end 22 of the substrate 16. The progressively closer spacing is accomplished by decreasing the pitch p (FIG. 6B) of the grooves in successive sets of grooves 28a-28g. As shown in FIG. 6B, the pitch p of the grooves includes the width W of the grooves and width S of the lands 25a-25g. The pitch p can be changed by changing the width S of the land, or by changing the width W of the grooves, or by changing both S and W.

Grooves 28a are sized to receive the jackets 30 of fibers 12. Grooves 28b-28g are adapted to receive the cladding 32 of the fibers 12. It is important that the jackets 30 remain on fibers 12 for a certain length on substrate 16 to lend stability to array 10. The dimensions of the grooves 28a-28g will depend on the size and type of fiber used in array 10. For a single mode fiber of the type described above, obtainable from Corning Glass Works, the grooves 28a can be from about 255 $\mu$m to about 280 $\mu$m wide, and grooves 28b-28g can be about 155 $\mu$m wide. The included angle of the grooves 28b-28g is about 70° when the grooves are etched in silicon. Starting with grooves 28b and progressing through successive sets of grooves 28g, the grooves 28b-28g are separated by lands 25b-25g having progressively thinner widths S in order to draw the fibers 12 closer together at end 22 of the substrate 16. For example, the widths S of the lands 25a-25g can be, respectively, 250, 100, 76, 53, 29, 5, and 4 $\mu$m. As noted above, fibers 12, as shown in FIG. 5, having portions 33 of reduced diameter can be used; for fibers 12 of this type, the dimensions of grooves 28g will depend on the diameter of the portion 33. For example, for diameters of portion 33 which range from 10 μm to 100 μm, the width of grooves range from 12 μm to 146 μm, respectively.

In one illustrative example of the present invention, the length of the substrate 16 is about 75 mm, the width of the substrate is about 25 mm, and the substrate is about 525 μm thick. The length of the grooves 28a is about 10 mm, the length of grooves 28b-28f about 2 mm, and the length of grooves 28g is about 25 mm. The length of planar areas 29a-29e is about 4 mm, and the length of planar area 29f is about 10 mm.

The substrate 16 is preferably formed from a silicon wafer (not shown) by photolithographic means. A suitable mask (not shown) is used to form the grooves 28b for a plurality of substrates 16 on the wafer. The wafer is cleaned before and after etching using acetone and deionized water, and the wafer is then blown dry with nitrogen. The etching agent is a 12% potassium hydroxide (KOH) solution with a bath temperature of approximately 62° C. This results in an etching rate in groove depth of approximately 0.29 μm/min. A more complete description of the method of forming the substrate 16 can be found in the aforementioned U.S. Pat. No. 4,923,275.

Great care must be used in the mounting of fibers 12 on substrate 16 due to the fragility and relatively small size of the fibers. In a first step, the fibers 12 are arranged parallel to each other in a holder (not shown) having channels to receive the jackets 30. The jackets 30 of the aligned fibers 30 are then inserted in the grooves 28a on substrate 16. A teflon-coated glass plate (not shown) is placed over the jackets 30 in grooves 28a. The glass plate can be about 150 μm thick and should be of a size to extend over grooves 28a. The glass plate is held in place by a needle in a micropositioner, model 221, obtainable from Rucker and Kolls. An ultraviolet light curable epoxy is introduced between the glass plate and substrate 16, and the epoxy is drawn into grooves 28a around the jackets 30 of fibers 12 by means of capillary action. The epoxy is partially cured by ultraviolet light which is directed onto the epoxy through the teflon-coated the glass plate. The teflon-coated glass plate is then removed, and the epoxy is fully cured by additional ultraviolet light.

In a next step, the cladding 32 of fibers 12 is eased into grooves 28b-28g of progressively finer pitch, and the fibers 12 are cemented in place in each set of grooves 28b-28f by means of a teflon-coated glass plate and UV curable epoxy as described previously; that is, the glass plate is placed directly over the fibers 12 in the grooves, held in position by a micropositioner, and UV curable epoxy is introduced around the fibers 12 in the grooves by means of capillary action. The fibers in the set of grooves 28g are cemented only at an end portion in order to facilitate the mounting of row 15 on row 11. The teflon-coated glass plate is removed after the epoxy has been partially cured, and full cure is then established with additional UV light.

The planar areas 29a-29f provide an area in which the fibers 12 are drawn closer together between the sets of generally parallel grooves 28b-28g of progressively smaller pitch. The planar areas 29a-29f are also important in the assembly steps just described in that they provide a means for viewing the fibers to determine if the fibers are actually aligned, since it is very difficult to see the fibers in the sets of grooves 28b-28g. The planar areas also provide a barrier to the capillary flow of adhesive so that the fibers can be attached to a particular set of grooves independently of adjacent sets of grooves.

Figure 8:
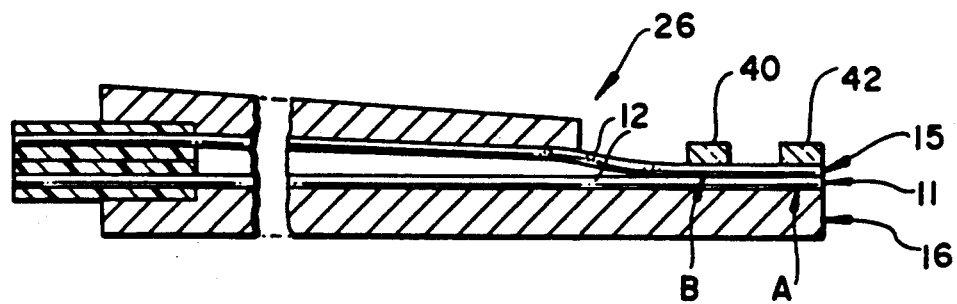
FIG. 8 is sectional view of an array in which a substrate is used to support the fibers in the second row.

In a preferred method of forming row 15, fibers 12 are assembled in a substrate 26 (FIG. 8) in the manner just described for substrate 16. Substrate 26 is identical to substrate 16 except that substrate 26 does not include a portion comparable to the portion of substrate 16 that includes planar area 29f and grooves 28g. Thus, the fibers 12 on substrate 26 extend beyond the end of the substrate 26 to facilitate the assembly of fibers 12 of row 15 on the fibers in row 11. When the fibers have been assembled on substrate 26, the substrate 26 is placed over substrate 16, as shown in FIG. 8. The fibers 12 in row 15 are cemented to the fibers 12 in row 11 at a point A (FIG. 8), using a UV curable epoxy and a teflon-coated glass plate 42; cementing the fibers at point A aids in alignment of the fibers at a point B. A glass plate 40 is placed over the two rows of fibers 11 and 15 at point B, and the glass plate is held in place by a pin attached to a micropositioner. UV curable epoxy is then introduced under the glass plate, and the epoxy is cured. A cross groove (not shown) in substrate 16, which extends perpendicular to the direction of the fibers 12, can be used to aid in the introduction of the epoxy in the grooves holding the fibers 12. When the fibers 12 have been cemented in place, a portion of the array facet 19 is removed by means of a dicing saw (not shown), and the facet 19 is then polished. The dicing saw can be a resin impregnated diamond blade, and the dicing step can be accomplished by cutting through the assembly at, for example, point B (FIG. 8).

In the forming of an array having a third row 17, the fibers 12 of row 17 can be mounted in another substrate 26 (not shown). The substrate and fibers are then placed over the substrate and fibers which form row 15, and the fibers of row 17 are cemented to the fibers of row 15 at a point just above point A. A glass plate 40 is then placed on the fibers in row 17, and the cementing and dicing steps described above are repeated. In this arrangement, the array includes a stack of three rows of fibers, row 11 being supported on substrate 16, row 15 being supported on a substrate 26, and row 17 being supported on a substrate 26 (not shown).

In an alternative arrangement, it is possible, with careful alignment of the fibers, to form an array in which the individual fibers 12 of row 15 are cemented directly to the fibers in row 11 using a UV curable epoxy. A substrate 26 with fibers 12 thereon is then mounted over the fibers 12 in row 15, in the manner described above, to form row 17. In this arrangement, the array has three rows of fibers, one substrate 16 and one substrate 26.

An important element of the present invention is the adhesive used to cement the fibers to the substrate. The adhesive must have low viscosity for good capillary action and a lower refractive index than that of the cladding to minimize radiation loss and cross talk between fibers. After the adhesive has cured, there should be low stress on the fiber to minimize micro-bending loss, and the adhesive should have adequate hardness to insure a polished surface of high quality. One suitable adhesive is Norland 61 adhesive which can be obtained from the Norland Co. However, a preferred adhesive is Lamdek U V Adhesive, Catalog No. 177 6921, obtainable from Dymax Engineering Adhesives, a division of American Chemical and Engineering Co., Torrington, CT.

In an illustrative example of the present invention, an array 10 was formed from single mode fibers having a core diameter of about 4 μm and a cladding diameter of about 125 μm. The fibers 12 were mounted in the manner described above to form an array of three rows of fibers as shown in FIG. 1.

It will be apparent that the number and spacing of fibers 12 can be changed to meet the needs of a particular application. An array (not shown) could extend the full length of a recording medium, or a recording head (not shwon) could include a plurality of arrays arranged side-by-side or in parallel rows.

Figure 2:
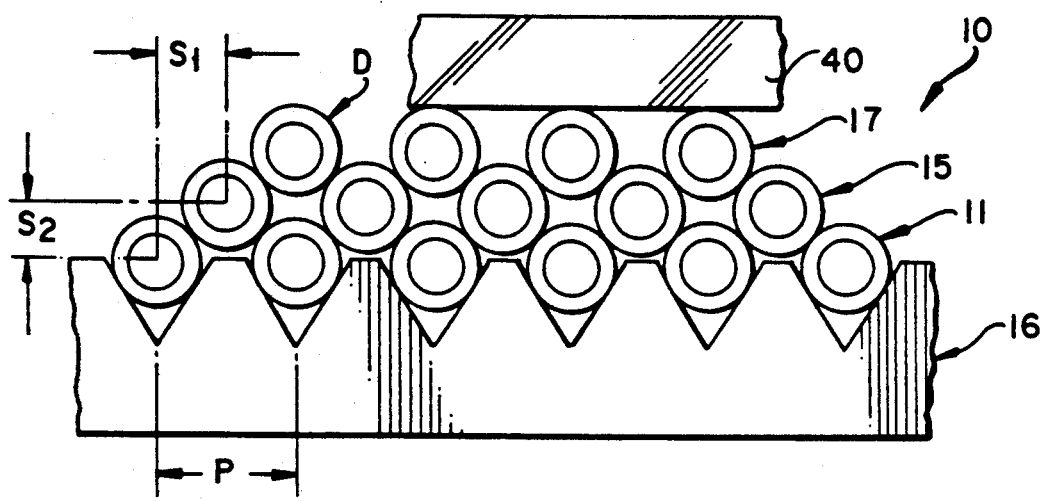
FIG. 2 is a front elevational view of the array shown in FIG. 1.
Figure 7:
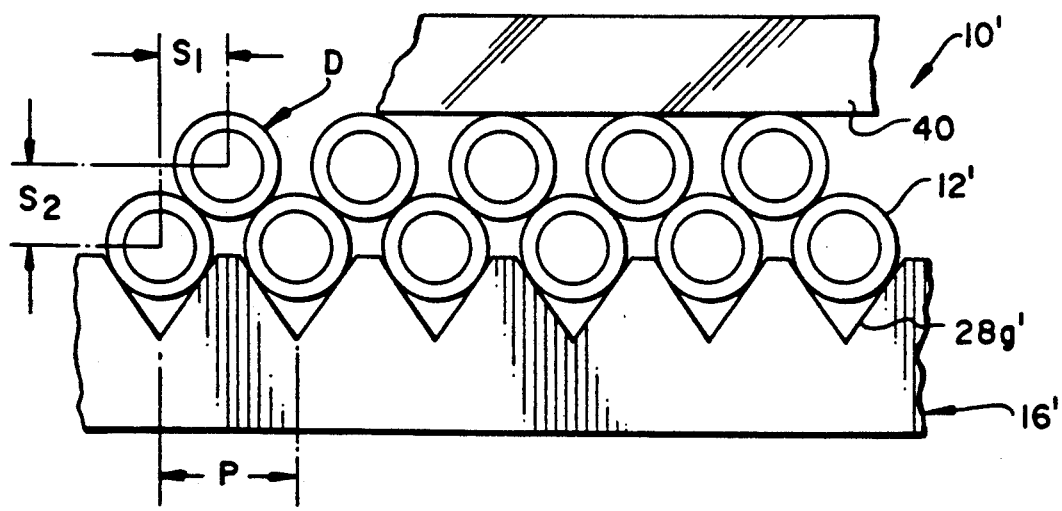
FIG. 7 is an front elevational view of an array in which the optical fibers are arranged to produce overlapping spots.

An array 10 can also be used to produce various print formats and to produce various effects on the recording medium. In FIG. 7, for example, there is shown an array 10' of optical fibers 12' in which the pitch p of the grooves 28g' has been made relatively small in order to achieve an overlap in the spots produced from the fibers 12 on a recording medium (not shown). In raster scanning printing systems, the spots may need to overlap to reduce the raster line visibility. If a gaussian intensity light source is used, the overlap may need to be on the order of 40% of the spot size. By adjusting the pitch of the grooves and the fiber diameter D, the desired overlap of the focused spots on the recording medium can be achieved. With reference to the arrays 10 and 10', shown in FIGS. 2 and 7, respectively, it will be seen that when the pitch p is reduced, the spacing between adjacent fibers in the same row is reduced and the spacing $s_1$, in a scan direction, between the centers of adjacent fibers 12 in adjacent rows is also reduced. Further, when the pitch p is reduced, the spacing $s_2$, in a cross-scan direction, between the centers of fibers 12 in adjacent rows is increased. Thus, it will be seen that spacing of the fibers needed to produce a desired overlap of the spots for a particular application can be controlled by selecting the fiber diameter D and the pitch of the grooves formed in the substrate 16.

The invention has been described in detail with particular reference to a preferred embodiment thereof, but it will be understood that variations and modifications can be effected within the spirit and scope of the invention.

I claim:

1. A method of making a fiber optic array, said array having stacked rows of optical fibers, said method comprising the steps of:

forming a plurality of grooves in a first substrate, said grooves extending to a first end of the substrate;

placing an optical fiber of a predetermined diameter in each of said grooves to form a first row of fibers in which the spacing of the fibers is determined by the pitch of said grooves;

cementing the fibers in the grooves;

forming a plurality of grooves in a second substrate;

cementing an optical fiber of a predetermined diameter in each of the grooves in said second substrate to form a second row of fibers in which a portion of each of said fibers extends beyond one end of said second substrate;

placing said second substrate and the fibers therein over said first substrate such that the fibers in the two substrates are in contact with each other and the spacing of said portions of the fibers in said second row is determined by the spacing of the fibers in said first substrate and the diameters of said fibers; and cementing the fibers in said second substrate to the fibers in said first substrate.

2. A method, as defined in claim 1, wherein said substrates are silicon wafers and the grooves are formed therein by photolithographic means.

3. A method, as defined in claim 1, wherein a teflon-coated glass plate is placed over said fibers prior to cementing the fibers in said grooves.

4. A method, as defined in claim 3, wherein an ultraviolet light curable epoxy is introduced between said plate and a substrate during said cementing steps.

5. A method, as defined in claim 4, wherein said epoxy is partially cured by directing ultraviolet light through said plate.

6. A method, as defined in claim 5, wherein said plate is removed after said partial curing and ultraviolet light is directed on said epoxy to fully cure the epoxy.

7. A method, as defined in claim 6, wherein a second glass plate is placed over the second row of fibers, and an epoxy is introduced between said second plate and said first substrate.

8. A method, as defined in claim 7, wherein an end of the array is removed by cutting through said second glass plate and said fibers.

9. A method, as defined in claim 1, wherein said second substrate is shorter than said first substrate.

10. A method, as defined in claim 1, wherein said grooves in each of said substrates are formed in sets of grooves separated by generally planar areas.

11. A method, as defined in claim 1, wherein an end of each of said fibers is of a reduced diameter relative to the remainder of the fiber.

12. A method, as defined in claim 1, wherein grooves are formed in a third substrate, fibers are mounted in the grooves of the third substrate to form a third row of fibers in which portions of the fibers extend from one end of the substrate, and said third substrate is mounted over said second substrate such that the fibers in the third row contact the fibers in said second row.

* * * * *